United States Patent Office 3,274,257
Patented Sept. 20, 1966

3,274,257
SYNTHESIS OF (ALKYLTHIO) PHENOLS
Walter Reifschneider, Midland, and Jacqueline S. Kelyman, Auburn, Mich., assignors to The Dow Chemical Company, Midland, Mich., a corporation of Delaware
No Drawing. Filed June 17, 1963, Ser. No. 288,512
3 Claims. (Cl. 260—609)

The present invention is concerned with chemical synthesis and is particularly directed to a new method for the preparation of (alkylthio) phenols. The present method will be understood generally by reference to the following general equation, which is representative only:

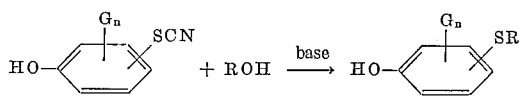

wherein $n$ is an integer of from 0 to 4, both inclusive, G is halo, alkyl, alkenyl, alkynyl, cycloalkyl, aryl, aralkyl, alkoxy, aryloxy, nitro, cyano, amido, amino, or hydrocarbyloxycarbonyl and R is an alkyl group of from 1 to 6 carbon atoms of which the compound ROH can have hydroxyl groups that are attached to primary or secondary but not tertiary carbon atoms.

While the method of the present synthesis is operable broadly, it finds its most important applications in the synthesis of compounds in which loweralkyl, loweralkenyl, loweralkynyl, cycloalkyl of from 5 to 6, both inclusive, carbon atoms, aryl of 6 carbon atoms, ar-loweralkyl, loweralkoxy, aryloxy being of 6 carbon atoms, nitro, cyano, amido, amino or loweracyloxy radicals are present in the employed compounds.

In the present specification and claims, the expression hydrocarbyloxycarbonyl refers to a monovalent radical of the general formula

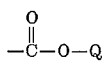

wherein each Q represents a hydrocarbon radical free of acetylenic and olefinic linkages selected from alkyl of up to 8 carbon atoms and aryl and substituted aryl of up to 10 carbon atoms.

The products of the present invention have numerous uses. Those in which unsaturated substituents appear are useful as monomers in the synthesis of polymeric substances. The compounds themselves are insecticidal, although some are substantially more active in this use than are others. Various of the compounds possess herbicidal properties. The compounds are germicidal. In general, any (thiocyanato) phenol or substituted (thiocyanato) phenol can be employed as starting material, and can be caused to react with any aliphatic alcohol of the sort defined, in the presence of any distinctively basic substance. Moreover, hydroxynaphthyl thiocyanates can be used as well as hydroxyphenyl thiocyanates. "Halo" in the present specification and claims is used in its most common meaning, to include fluoro, chloro, bromo, and iodo.

Thus, one of the advantages of the novel synthesis is that it permits of ready preparation of (alkylthio) phenols and naphthols and their substituted derivatives of a variety and scope hitherto unavailable or available only with difficulty. Starting from phenol or substituted phenol itself, the present process goes forward efficiently, economically, and in excellent yields under convenient conditions in but two steps of which the first is thiocyanation. Thus, another advantage of the present invention is its great efficiency.

More exactly stated, a hydroxyaromatic thiocyanate or substituted hydroxyaromatic thiocyanate whereof the substituents are selected from halogen, nitro, alkyl, alkenyl, alkynyl, cycloalkyl, aryl, cyano, amido, amino, and hydrocarbyloxycarbonyl, as hereinbefore defined is contacted in the presence of a base with an alkanol of which the aliphatic moiety is of 1 to 6 carbon atoms and has one only hydroxyl group and that one is attached to a carbon atom that is a primary or secondary, and of which the aliphatic hydrocarbon group is the moiety to be introduced in the alkylthio moiety in the finished compound, at a temperature and over a period of time sufficient to produce an (alkylthio) phenol derivative. The reaction appears to involve a metathesis of some sort but byproducts of reaction have not yielded easily to attempts to identify them.

In preparation of any product by the process of the present invention, the alcohol and (thiocyanato) phenol react together in equimolecular amounts, but the reaction is favored by the employment of excess alcohol in addition to that amount necessary as reactant and, if so employed, as liquid reaction medium. No excess is necessary, some product being obtained when the alcohol is employed in any amount such as an amount less than equimolecular with the (thiocyanato) phenol and therefore in limiting amount. However, conveniently, a modest excess of from a few percent to one hundred percent or more can be employed.

Because the present reaction involves only the (thiocyanato) group of the phenol, virtually any compound possessing these two groups attached to the same aromatic nucleus can be used. In addition to the position isomers of the hydroxyphenyl thiocyanates, the various alkylhydroxyphenyl thiocyanates can be employed. Also, with equally good results, the various alkenyl and alkynyl hydroxyphenyl thiocyanates, including those having more than one ethylenic or acetylenic unsaturation per alkenyl or alkynyl moiety. Also, such aromatic compounds are employed with good results. It is to be understood that the alkoxy- or aryloxy-portion is in addition to, not at the expense of, the aromatic hydroxy group. Also, aryl substituents upon the hydroxyphenyl thiocyanate nucleus are acceptable. Similarly, such other substituents as may affect the properties of the resulting products but do not interfere with the reaction at the thiocyanato site can be present upon the hydroxyphenyl ring; these include the cyano radical, amido structures, and the ester structures presently identified as organyloxycarbonyl, as represented by the hydrocarbyloxycarbonyl moieties. These latter designations indicate monovalent organic radicals of the formula

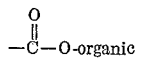

and particularly

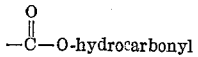

Commonly the thiocyanato radical will be in a position para with respect to the aromatic hydroxyl group; but this is immaterial in the present invention.

As base, there can be employed the bases commonly known and used; alkali metal hydroxides, alkali metal alkoxides, alkali metal carbonates, basic ion exchange agents, strong amines, and so forth. The identity of the base, or its strength, do not appear to be critical; in general it is advantageous that the base be strong.

The employed alkanol can be any alkanol of up to 6 carbon atmos, of which the hydroxyl group is attached to a primary or secondary carbon atom. Thus, methanol 6 carbon atoms, of which the hydroxyl group is attached to reacts well, as also does ethanol, and normal and isopropanol. The isomers of butanol except tertiary butanol also enter well into the present reaction.

In the case of the alkanols higher than butanol, there can be a tertiary carbon atom; that is to say, a carbon atom bonded only to other carbon atoms: but the reactive hydroxyl group cannot be bonded to a carbon atom to each of the other bonds of which carbon is attached. Thus, that pentanol isomer which is formally named 2,2-dimethylpropanol is successfully employed, whereas its 1,1-dimethyl isomer is not.

The reactant substances can be combined in any quantity, order, or sequence. Reaction takes place molecule for molecule between the hydroxyphenyl thiocyanate and the alkanol, and when good results are desired, allowance for this ratio will be made. Commonly it will be preferred to employ the alkanol in excess as solvent.

When a mixed product is acceptable, as in generalized industrial application in which a mixture of, for example, fairly closely related position isomers and homologues is acceptable, in applications in which their differences of properties are not excessive, such mixed thioether product can be prepared by employing mixed closely related hydroxyphenyl thiocyanate and mixed alkanol starting materials. The components of such mixtures tend to react at dissimilar rates, but all react, and useful product results.

The alcohol and (thiocyanato) phenol with or without solvent or other liquid reaction medium, are combined with a dispersion in liquid reaction medium, which is desirably an inert solvent solution or an alcohol solution employing the same alcohol as that to be reacted with the (thiocyanato) phenol, of such base as an alkali metal alkoxide, tertiary or other strongly basic amine, or alkali metal hydroxide. The alkali metal alkoxides tend to be soluable in the alkanols from which they are derived, and for this reason are sometimes preferred. Desirably, an amount equivalent to one to three times the molecular proportion of (thiocyanato) phenol of the said base should be present in the solution thereof. Upon the completion of the combining of the reactants the resulting reaction mixture is allowed to react. Reaction can be hastened as the mixture is heated, for example under reflux, for a period of time, typically for 2-6 hours. While some of the desired product forms immediately upon the contacting together of the said reactants at or about room temperature, yields obtained vary according to starting material. Some yields tend to be quite low until after either an extended reaction time or such heating as is hereinbefore described.

When the reaction has gone forward to the desired degree, typically to exhaustion of any limiting reactant, excess alcohol or other solvent can be removed by vaporization, as, for example, under subatmospheric pressure, as the solution resulting from the foregoing reaction is permitted spontaneously to cool to room temperature. The residue resulting from removal of some or most of the solvent can then be poured into a mixture of ice and concentrated hydrochloric acid. When the resulting product separates as a solid, it is collected by filtration and thereafter recrystallized from a suitable solvent such as methyl cyclohexane, or a mixture of benzene and a light petroleum fraction boiling in the range of 60–70° C. or other recrystallization solvent if desired.

When the product separates as a gum or liquid, the aqueous mixture resulting from the pouring of the product into ice and hydrochloric acid can be repeatedly first extracted with diethyl either, and the ether extract layers permitted to separate from the aqueous layer. Each ether layer is removed, the ether extracts are combined, washed with water, and with saturated sodium chloride solution, and the resulting washed ether extract is dried over sodium sulfate. From the resulting dried solution, ether solvent is removed by vaporization, as by gentle warming, under subatmospheric pressure if desired, to obtain a product residue. When this product residue is a solid, it can be taken up in and recrystallized from a suitable solvent of the sort previously indicated. When the product residue is a liquid, it can be distilled, desirably under subatmospheric pressure.

Products have been characterized by such traditional methods as mixed-melting-point determinations with authentic samples of compounds of assigned structure, infrared spectroscopy, preparation of derivatives, and other physical and chemical methods.

The reaction follows the indicated course, goes forward smoothly, obtains good yields, and makes efficient use of starting materials.

The reaction is believed to depend upon a metathesis of some sort but the details of the reaction mechanism have not been defined.

Over the methods known in the prior art, the present method offers numerous advantages. It permits conversion from a phenol or substituted phenol into the corresponding thioether phenol or thioether (substituted) phenol in but two steps, thiocyanation and the present process.

The new method, by its brevity and simplicity, permits preparation of thioether phenols and their substituted derivatives in a range of variety hitherto unavailable.

Preparations in the best manner now known of the present invention are illustrated by the following procedures.

*Example I.—Preparation of 4-(methylthio)-o cresol*

A slurry was prepared, consisting essentially of 37 grams (0.9 mole) sodium hydroxide and 100 milliliters (a substantial molecular excess) of methanol.

To this was added as a slow, continuous stream 49.6 grams (0.3 mole) 4-(thiocyanato)-o cresol dispersed in 150 milliliters methanol. When the addition was complete, the resulting reaction mixture was heated at its boiling temperature (approximately 60–70° C.) and under reflux for four hours.

At the end of 4 hours reaction time, excess methanol used as solvent was removed by vaporization, and the resulting liquid residue was poured into a mixture of ice and concentrated hydrochloric acid. The ice melted, and excess basic matter (sodium hydroxide) was neutralized. The resulting aqueous mixture was extracted successively with each of three 200 milliliter portions of ether. The ether extracts were combined, washed with saturated sodium chloride aqueous solution, and dried over anhydrous sodium sulfate.

From the resulting washed and dried ether product solution, ether solvent was vaporized and removed, and the resulting residue was distilled under vacuum to obtain 32 grams of 4-(methylthio)-o cresol, a yield of 70 percent based upon starting 4-(thiocyanato)-o cresol. The product boiled in the range of 99 to 104° C. under pressure of 0.7 millimeter mercury absolute, had a refractive index of 1.6038 for the D line of sodium light at 25° C. The published boiling temperature of this product is 136–138° C. under 5 millimeters mercury pressure. The identity of the product was confirmed by infrared spectroscopy.

*Example II.—p-(Methylthio) phenol*

To 200 milliliters methanol was added slowly, portionwise, and with stirring, 4.6 grams (0.2 mole) sodium to prepare a solution of 0.2 mole sodium methoxide in excess methanol. To the resulting sodium methoxide solution was added, slowly and as a continuous stream, 30.2 grams (0.2 mole) p-(thiocyanato) phenol dispersed in 150 milliliters methanol.

Upon completion of the addition of the thiocyanatophenol in methanol, the resulting reaction mixture was heated at its boiling temperature and under reflux for 4 hours to carry the reaction to completion. Upon the completion of the reaction time, excess methanol was vaporized and removed, and the resulting residue poured into a mixture of ice and concentrated hydrochloric acid.

The ice melted, and a solid separated from the aqueous mixture on standing. The solid was collected by filtration and taken up in and recrystallized from methylcyclohexane to obtain 17.5 grams p-(methylthio) phenol. The yield represented 63 percent by weight of starting p-(thiocyanato) phenol, and the product was in the form of white plate-like crystals melting at 81–83° C. This compares with a published melting point for the compound of 85° C. Identity of the compound was confirmed by infrared spectroscopy.

*Example III.—4-(methylthio)-3,5-xylenol*

In procedures essentially the same as those employed in Example I, with sodium hydroxide, and with methanol as both reactant and solvent, and employing 4-(thiocyanato)-3,5-xylenol over 4 hours reaction time at the reflux temperature of the reaction mixture, there is obtained a 4-(methylthio)-3,5-xylenol product. The product is purified by ether extraction from the aqueous mixture wherein it is prepared, vaporization of ether extraction solvent, and recrystallization from methylcyclohexane.

The product from a preparation representative of the present example was found to be a white crystalline product melting at 64–65.5° C.

*Example IV.—2-(methylthio)-4-chloro-3,5-xylenol*

In the present example, the starting phenol, chosen upon the basis of the general formula provided in the first paragraph of the present specification is 2-thiocyanato-4-chloro-3,5-xylenol. The reaction is carried out with methanol as reactant and reaction solvent, and employs sodium methoxide as base. As a result of these procedures, there is obtained a 2-(methylthio)-4-chloro-3,5-xylenol product as a liquid boiling at 80° C. under 0.25 millimeter mercury pressure absolute, and having a refractive index of 1.5858 for the D line of sodium light at 25° C.

*Example V*

In procedures essentially the same as those of Example II, employing, as starting material, 4-hydroxy-2-iodophenyl thiocyanate, (an off-white solid melting at 109–111° C.) in isopropanol solution of potassium isopropoxide there is obtained a 3-iodo-4-isopropylthio phenol as a white crystalline solid.

In procedures similar to the foregoing, employing 6-hydroxy-m-tolylthiocyanate and ethanol in the presence of tertiary ethylamine, there is obtained a 2-ethylthio-p-cresol product as off-white crystalline solid platelets. Also, employing 4-hydroxy-3-nitro-2,6-xylylthiocyanate (melting at 184–185° C.) in a normal propanol solution of sodium normal propoxide, there is obtained a 1-nitro-4-n-propylthio-3,5-xylenol product as pale yellow crystalline platelets.

*Example VI.—2,6-dichloro-4-(methylthio) phenol*

A first dispersion is prepared consisting essentially of 50 grams (0.75 mole) 85 percent pure potassium hydroxide dispersed in 150 milliliters methanol. A second dispersion is prepared consisting essentially of 55 grams (0.25 mole) 2,6-dichloro-4-(thiocyanato) phenol dissolved in 300 milliliters methanol.

The said first solution is added to the said second solution to obtain a reaction mixture. Upon the completion of the preparation of the said reaction mixture, the resulting solution is stirred continuously at room temperature for approximately 2 hours to carry the reaction to completion and obtain the desired product. At the conclusion of 2 hours reaction time, excess methanol is vaporized and removed and the resulting residue is poured into a mixture of ice and excess concentrated hydrochloric acid. From the resulting aqueous solution a solid product material separates and is collected by filtration, taken up in methanol and recrystallized from a methanol-water system to obtain 2,6-dichloro-4-(methylthio) phenol product. The product melts at 54–56° C. The assigned structure is confirmed by infrared spectrum analysis.

*Example VII.—2-bromo-6-chloro-4-(methylthio) phenol*

A first dispersion is prepared consisting essentially of 34.2 grams (0.34 mole) triethylamine dissolved in 75 milliliters methanol. A second solution is prepared consisting essentially of 30 grams (0.113 mole) 2-bromo-6-chloro-4-(thiocyanato) phenol dissolved in 125 milliliters methanol. The first said dispersion is added to the said second solution to obtain a reaction mixture. Upon the completion of the preparation of the said reaction mixture, the resulting solution is stirred continuously as it is heated at its reflux temperature, about 60–70° C., for approximately 2 hours to carry the reaction to completion and obtain the desired product. At the conclusion of 2 hours reaction time, excess methanol is vaporized and removed and the resulting residue is poured into a mixture of ice and excess concentrated hydrochloric acid. The resulting aqueous solution is extracted with three 200 milliliter portions of diethyl ether, the ether extracts combined, washed with saturated sodium chloride solution, and dried over anhydrous sodium sulfate. Ether is vaporized and removed and the resulting product distilled under subatmospheric pressure. As a result of these operations, there is obtained a 2-bromo-6-chloro-4-(methylthio) phenol product as a white crystalline solid. The compound melts at 43–44.5° C. The assigned structure is confirmed by infrared spectrum analysis.

*Example VIII.—p-(Hexylthio) phenol*

A first solution is prepared consisting essentially of 146.2 grams (1 mole) p-hydroxyphenyl thiocyanate dispersed in 250 milliliters hexanol. A second solution is prepared consisting essentially of 40 grams (1 mole) sodium hydroxide dispersed in 100 milliliters hexanol. The second said dispersion is added to the same first solution to obtain a reaction mixture. Upon the completion of the preparation of the said reaction mixture, the resulting mixture is stirred continuously at ambient temperature (21–24° C.) for approximately 165 hours reaction time to carry the reaction to completion and obtain the desired product. Upon the conclusion of the reaction time, the resulting mixture is warmed in a vacuum oven and excess hexanol is vaporized and in large part removed, and the resulting residue is poured into a mixture of ice and excess concentrated hydrochloric acid. From the resulting aqueous solution, an oily product material separates and is collected by ether extraction. Ether extract is warmed to vaporize and remove ether; the resulting oily product is distilled to obtain a p-(hexylthio) phenol product.

The hydroxyphenyl thiocyanate (which may also be called a (thiocyanato) phenol) reactant of choice can readily be selected by selecting such compound wherein the (thiocyanato) group occupies the position whereinto it is desired to introduce the

—S—R moiety characteristic of the products of the present invention.

The alkanol reactant of choice can readily be selected by choosing the

H—O—R compound whereof R has the identity of the thiotherifying moiety it is desired to introduce into the product compound.

In view of the detailed statements of the best methods now known, as hereinbefore set forth, and with the guidance of the foregoing comments on selection of reactants, skilled chemists can readily prepare desired other products according to the present process.

The following are representative of starting materials thus selected, and their products.

Employing 3-fluoro-4-(thiocyanato) phenol in methanol solution in the presence of sodium methoxide, a white crystalline 3-fluoro-4-(methylthio) phenol product.

Repeating the above but using 3-chloro-4-(thiocyanato) phenol, a 3-chloro-4-(methylthio) phenol product as a white crystalline solid melting at 66.5–68° C.

Employing 2-(methylthio)-4-thiocyanatophenol and methanol there is obtained a 2,4-bis(methylthio) phenol product as an oily liquid. Upon crystallization from solvent the product is a white crystalline solid melting at 40–41° C.

From ethanol and 2-methyl-4-hydroxyphenyl thiocyanate, a 4-(ethylthio)-m-cresol product.

From 2,2-dimethylpropanol and 2-phenyl-4-(thiocyanato) phenol, a 4-(2,2-dimethylpropylthio)-2-phenyl phenol product as a white crystalline solid.

From 2-nitro-4-thiocyanatophenol and methanol, a white crystalline solid 4-(methylthio)-2-nitrophenol product.

From 4-hydroxy-3-vinylphenyl thiocyanate and butanol 4-(butylthio)-2-vinylphenol.

From 2-hydroxy-5-thiocyanatophenyl acetate and 2-propanol, a 5-(2-propylthio)-2-hydroxyphenyl acetate.

From 2-(p-chlorophenoxy)-4-thiocyanato phenol and n-butanol, 2-(p-chlorophenoxy)-4-(butylthio) phenol.

From 2,3,5,6-tetrakis(methoxy)-4-hydroxyphenyl thiocyanate and methanol, 2,3,5,6 - tetrakis(methoxy)-4-(methylthio) phenol.

From 2-benzyl-3-cyano-4-thiocyanatophenol and hexanol, 2-benzyl-3-cyano-4-(hexylthio) phenol.

From 2-cyclopentyl-4-(thiocyanato) phenol and a mixture of butanols and pentanols, a mixture of 3-cyclopentyl-4-hydroxyphenylthioalkanes of which the alkane groups are of 4 to 5, inclusive, carbon atoms.

From 5-hydroxy-2-thiocyanatobenzamide and hexane, 5-hydroxy-2-hexylthiobenzamide.

From 3-ethynyl-4-thiocyanatophenol and methanol, 3-ethynyl-4-(methylthio) phenol.

We claim:
1. Method of preparing phenolic thioethers of the general formula

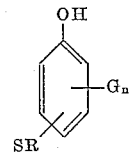

which comprises contacting a compound of the formula

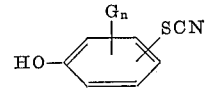

with a compound of the formula

in the presence of a base wherein G is loweralkyl, loweralkenyl, loweralkynyl, cycloalkyl of from 5 to 6, both inclusive, carbon atoms, ar-loweralkyl, aryl of 6 carbon atoms, loweralkoxy, aryloxy of 6 carbon atoms, nitro, cyano, amido, amino, loweracyloxy, or halo; R is loweralkyl, loweralkenyl, loweralkynyl, cycloalkyl being of from 5 to 6, both inclusive, carbon atoms, halo loweralkyl, ar-loweralkyl, or loweralkanoyl; and in the compound HOR the HO radical is bonded to a carbon atom to which at least one hydrogen is also bonded; and $n$ is an integer of from 0 to 4, both inclusive.

2. Method of claim 1 wherein the contacting is carried out in a liquid reaction medium.

3. Method of claim 2 wherein the compounds in contact are heated together for at least a part of the period of time at a superambient temperature.

No references cited.

CHARLES B. PARKER, *Primary Examiner.*

DELBERT R. PHILLIPS, *Assistant Examiner.*